United States Patent
Ohmura et al.

(10) Patent No.: US 10,626,942 B2
(45) Date of Patent: Apr. 21, 2020

(54) LOWER-SIDE SPRING-RECEIVING MEMBER

(71) Applicant: NHK Spring Co., Ltd., Kanagawa (JP)

(72) Inventors: Shuji Ohmura, Kanagawa (JP); Shohei Hosomi, Kanagawa (JP); Jun Umeno, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 15/551,455

(22) PCT Filed: Feb. 4, 2016

(86) PCT No.: PCT/JP2016/053409
§ 371 (c)(1),
(2) Date: Aug. 16, 2017

(87) PCT Pub. No.: WO2016/132925
PCT Pub. Date: Aug. 25, 2016

(65) Prior Publication Data
US 2018/0045263 A1 Feb. 15, 2018

(30) Foreign Application Priority Data
Feb. 17, 2015 (JP) .................. 2015-028306

(51) Int. Cl.
*F16F 1/12* (2006.01)
*B60G 11/16* (2006.01)
(Continued)

(52) U.S. Cl.
CPC .............. *F16F 1/121* (2013.01); *B60G 11/16* (2013.01); *F16F 1/12* (2013.01); *F16F 1/122* (2013.01);
(Continued)

(58) Field of Classification Search
CPC ............ B60G 2204/128; B60G 15/068; B60G 15/067; B60G 2204/1242; B60G 2202/12;
(Continued)

(56) References Cited

U.S. PATENT DOCUMENTS 3,051,469 A * 8/1962 Boschi .................. B60G 11/16
267/248
5,470,049 A * 11/1995 Wohler .................. B60G 11/16
267/170
(Continued)

FOREIGN PATENT DOCUMENTS

| CN | 1932328 A | 3/2007 |
| CN | 201396389 Y | 2/2010 |

(Continued)

OTHER PUBLICATIONS

International Search Report for International Application No. PCT/JP2016/053409, dated Mar. 1, 2016.
(Continued)

*Primary Examiner* — Robert A. Siconolfi
*Assistant Examiner* — Mahbubur Rashid
(74) *Attorney, Agent, or Firm* — Marshall, Gerstein & Borun LLP

(57) ABSTRACT

A lower-side spring-receiving member of a suspension device, receiving a suspension spring structured to have a rising section at a lower side of the suspension spring, having a partially annular shape and including: a base end portion arranged at one end of the lower-side spring-receiving member wherein an end of the suspension spring is inserted into the base end portion; a slope portion arranged at the other end of the lower-side spring-receiving member and having a thickness in a cross-sectional view varying so as to follow a shape of the rising section of the suspension spring; and a holding portion that is arranged between the
(Continued)

base end portion and the slope portion and holds the suspension spring, wherein the slope portion has a recess portion (Nk) formed on its bottom-surface; the recess portion includes a ridge portion is formed in a substantially mountain shape in a cross-sectional view taken along a radial direction of the partially annular shape and may be or may not be in contact with a mounting surface when no spring load of the suspension spring is applied.

13 Claims, 7 Drawing Sheets

(51) Int. Cl.
F16F 9/32 (2006.01)
F16F 9/512 (2006.01)
B60G 15/06 (2006.01)

(52) U.S. Cl.
CPC ............... *F16F 9/32* (2013.01); *F16F 9/512* (2013.01); *B60G 15/065* (2013.01); *B60G 2202/312* (2013.01); *B60G 2204/12422* (2013.01); *F16F 1/126* (2013.01); *F16F 2228/14* (2013.01)

(58) Field of Classification Search
CPC ............ B60G 2204/124; B60G 15/063; B60G 2202/312; B60G 2204/12422; F16F 1/126; F16F 1/12; F16F 1/122
USPC ........................................................ 267/220
See application file for complete search history.

(56) References Cited

U.S. PATENT DOCUMENTS

| 6,273,407 | B1 | 8/2001 | Germano | |
| 6,733,023 | B2* | 5/2004 | Remmert | B60G 11/16 267/179 |
| 6,948,728 | B2* | 9/2005 | Pflugner | B60G 15/00 267/220 |
| 7,490,818 | B2* | 2/2009 | Kato | B60G 11/16 267/219 |
| 7,837,016 | B2* | 11/2010 | Chamousset | B60G 15/068 188/321.11 |
| 9,028,150 | B2* | 5/2015 | Nagashima | B60G 15/068 384/420 |
| 9,334,897 | B2* | 5/2016 | Nagashima | F16C 33/74 |
| 9,415,656 | B2* | 8/2016 | Sakairi | F16C 17/10 |
| 9,499,021 | B2* | 11/2016 | Nakano | B60G 11/16 |
| 9,545,830 | B2* | 1/2017 | Bedeau | B60G 15/063 |
| 2006/0131119 | A1 | 6/2006 | Ishikawa | |
| 2008/0048370 | A1* | 2/2008 | Corlet | B60G 15/068 267/220 |
| 2014/0265081 | A1 | 9/2014 | Nakano et al. | |
| 2016/0031280 | A1* | 2/2016 | Arano | B60G 11/16 267/219 |

FOREIGN PATENT DOCUMENTS

| CN | 202623837 U | 12/2012 |
| EP | 1078783 A2 | 2/2001 |
| JP | 3820361 B2 | 9/2006 |
| JP | 2013213562 A | 10/2013 |
| JP | 2014181776 A | 9/2014 |
| JP | 2014199134 A | 10/2014 |
| WO | WO-2014148364 A1 | 9/2014 |

OTHER PUBLICATIONS

Chinese Office Action with an English Translation for Application No. 2016800103999, dated Jul. 19, 2018.
Extended European Search Report for International Application No. PCT/JP2016053409, dated Oct. 23, 2018.

* cited by examiner

FIG. 3A
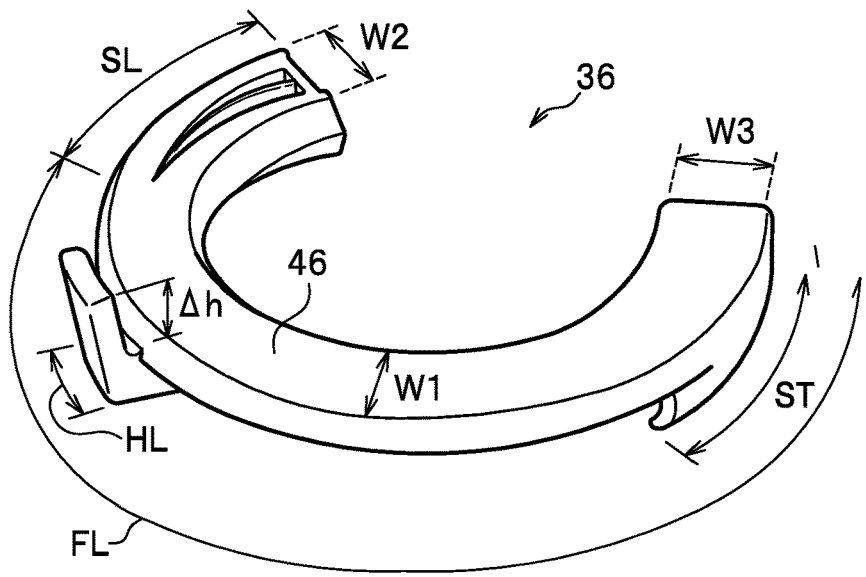
FIG. 3B
FIG. 3C
FIG. 3D
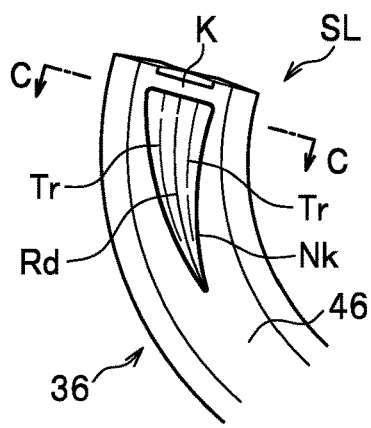
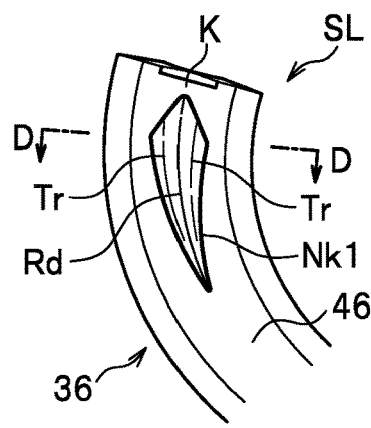
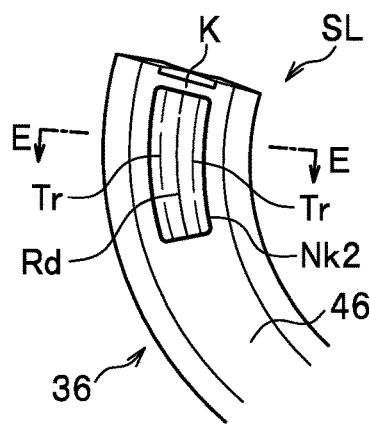
FIG. 3E
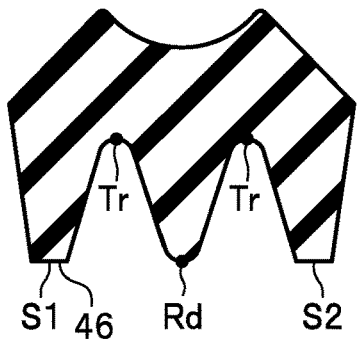

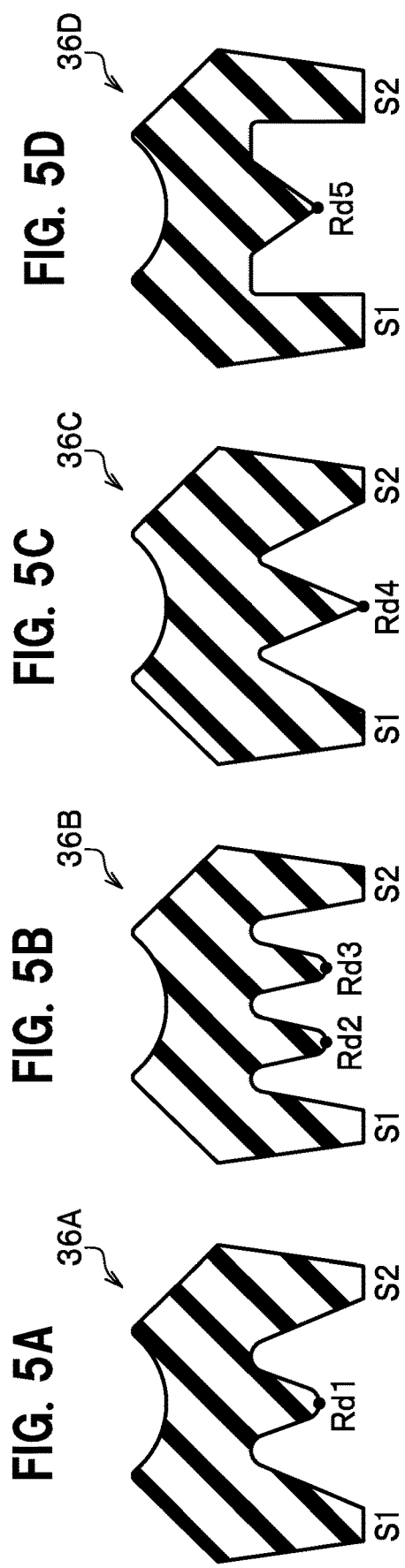
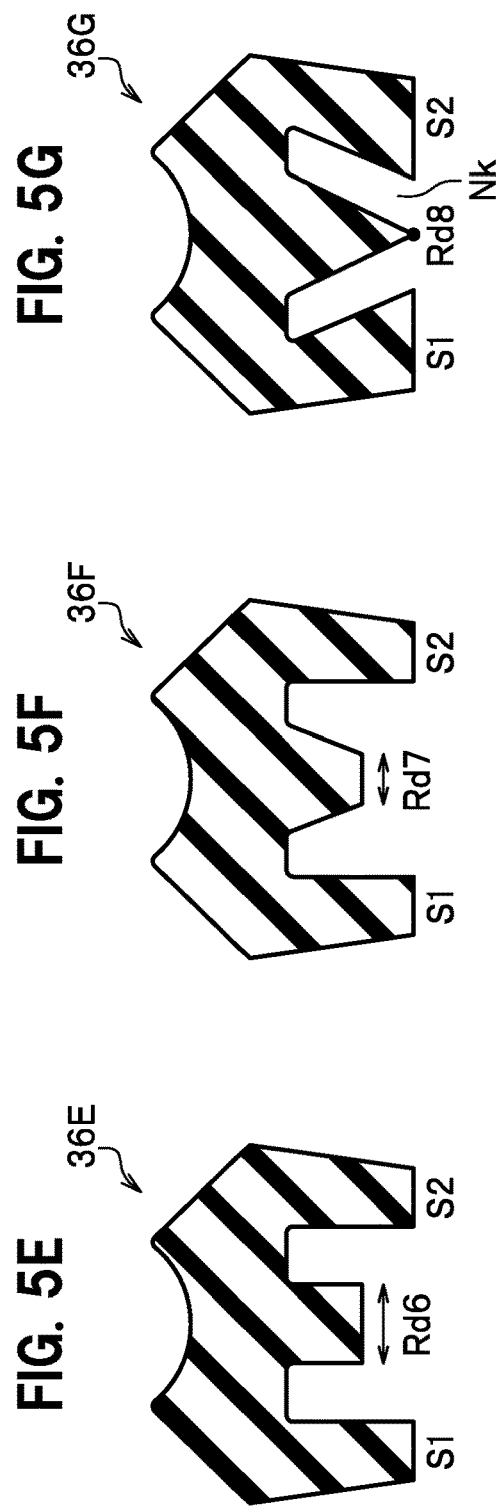

LOWER-SIDE SPRING-RECEIVING MEMBER

CROSS-REFERENCE TO RELATED APPLICATION

The present application is the US national phase of International Application No. PCT/JP2016/053409, filed Feb. 4, 2016, which claims priority to Japanese Application No. 2015-028306, filed Feb. 17, 2015. The priority application, JP 2015-028306, is hereby incorporated by reference.

TECHNICAL FIELD

The present invention relates to a lower-side spring-receiving member.

BACKGROUND ART

Generally, when a spring load is applied on a spring-receiving member for a suspension spring formed of, for example, an elastic material, a deformation of the spring-receiving member cannot sufficiently follow a deformation of the suspension spring, which causes a gap to be formed between the suspension spring and the spring-receiving member.

If foreign matter such as sand or gravel enters the gap formed in such a situation, coating film of the suspension spring may wear out to cause a base surface of the suspension spring to be exposed, resulting in an occurrence of corrosion and breakage of the suspension spring. This phenomenon occurs more frequently around a lower-side spring-receiving member than an upper-side spring-receiving member.

PTL1 describes "an elastic sheet that can prevent a coil spring from, for example, being chipped in its coating or being broken as a result of the entry of mud, sand, or the like" (see the summary and paragraph [0030] of PTL1 (paragraph 0034 of US corresponding application).

CITATION LIST

Patent Literature

PTL1: Japanese Patent Application Publication No. JP2014-199134A (US corresponding application US2014-265081A1)

SUMMARY OF INVENTION

Technical Problem

A spring-receiving member (rubber pad) described in PTL1 includes a spring-receiving-side recess portion (a second recess portion) both in an embodiment and its modification example (see FIGS. 8, 17, 22, 24, and 26 of PTL1). This second recess portion is provided for a purpose of preventing a back surface of a seating portion right under the coil spring from being damaged due to contact with a mounting surface of the spring-receiving member (see paragraphs 0072, 0120, 0123, and 0125 of PTL1).

Such a conventional spring-receiving member may have a recessed volume of the recess portion increased, which may impair followability to the suspension spring. Specifically, there is a problem that the spring-receiving member cannot sufficiently follow the deformation of the suspension spring when the spring-receiving member returns from a compressed state to an original state. This causes a problem that foreign matter such as sand and gravel enters the gap to cause corrosion and breakage in the suspension spring.

Further, for example, a lower-side spring-receiving member described in FIG. 8 of PTL1 has a large recessed volume of the recess portion, and therefore, a magnitude of reaction force that the spring-receiving member can apply on the suspension spring is small as shown by a thick solid line in a graph of a comparative example (III) of FIG. 7A of the present disclosure. Furthermore, there is a point in the graph where the reaction force sharply increases in magnitude against a deflection (see a portion of the graph (III), which is indicated by an arrow and a thick broken line and has the deflection indicated by T2, of the comparative example in FIG. 7A). This may cause a problem of making a crew member have bottom-touching uncomfortableness. Note that graphs of FIGS. 7A and 7B show load-deflection characteristic diagrams in which the deflection amount (i.e., depression amount) is plotted on a horizontal axis and a magnitude of the load (i.e., reaction force) on a vertical axis.

Accordingly, it is an object of the present invention to provide a lower-side spring-receiving member capable of supporting the suspension spring without causing a gap to be formed between the suspension spring and the spring-receiving member, and reducing the bottom-touching uncomfortableness in order to solve the above problem.

Solution to Problem

The present invention provides a lower-side spring-receiving member of a suspension device, receiving a suspension spring at a lower side of the suspension spring that is structured to include a rising portion extending up from a non-elastically-deformable end turn portion of the suspension spring, the lower-side spring-receiving member having a partially annular shape, and comprising:

a base end portion arranged at one end of the lower-side spring-receiving member, wherein an end of the suspension spring is inserted in the base end portion;

a slope portion arranged at the other end of the lower-side spring-receiving member and having a thickness in a cross-sectional view, the thickness varying in accordance with a shape of the rising portion of the suspension spring; and a holding portion arranged between the base end portion and the slope portion, and holding the suspension spring, wherein the slope portion includes a recess portion formed on its bottom-surface;

the recess portion includes: at least one of a ridge portion being formed in a substantially mountain shape in a cross-sectional view taken along a radial direction of the partially annular shape and in contact with a mounting surface on which the lower-side spring-receiving member is mounted when no spring load is applied from the suspension spring, and a ridge portion formed in a substantially mountain shape in a cross-sectional view taken along the radial direction and not being in contact with the mounting surface when no spring load is applied from the suspension spring; and the ridge portion contacts the mounting surface and is deflected and compressed to apply a reaction force on the suspension spring when the spring load is applied on the lower-side spring-receiving member.

In another aspect, the present invention provides a lower-side spring-receiving member
having a partially annular shape; and
comprising:
a base end portion arranged at one end of the lower-side spring-receiving member, wherein an end portion of the suspension spring is structured to include a rising portion extending up from a non-elastically-deformable end turn portion of the suspension spring is inserted in the base end portion;
a slope portion arranged at the other end of the lower-side spring-receiving member and having a thickness in a cross-sectional view, the thickness varying in accordance with a shape of the rising portion of the suspension spring; and
a holding portion arranged between the base end portion and the slope portion, and holding the suspension spring, wherein
the slope portion includes a recess portion formed on its bottom-surface;
the recess portion includes at least one ridge portion being formed in a substantially mountain shape in a cross-sectional view taken along a radial direction of the partially annular shape and in contact with a mounting surface on which the lower-side spring-receiving member is mounted when no spring load is applied from the suspension spring; and
the ridge portion contacts the mounting surface and is deflected and compressed to apply a reaction force on the suspension spring when the spring load is applied on the lower-side spring-receiving member.

In yet another aspect, the present invention provides a lower-side spring-receiving member
having a partially annular shape; and
comprising:
a base end portion arranged at one end of the lower-side spring-receiving member, wherein an end portion of the suspension spring is structured to include a rising portion extending up from a non-elastically-deformable end turn portion of the suspension spring is inserted in the base end portion;
a slope portion arranged at the other end of the lower-side spring-receiving member and having a thickness in a cross-sectional view, the thickness varying in accordance with a shape of the rising portion of the suspension spring; and
a holding portion arranged between the base end portion and the slope portion, and holding the suspension spring, wherein
the slope portion includes a recess portion formed on its bottom-surface;
the recess portion includes at least one ridge portion being formed in a substantially mountain shape in a cross-sectional view taken along a radial direction of the partially annular shape and not being in contact with a mounting surface on which the lower-side spring-receiving member is mounted when no spring load is applied from the suspension spring; and
the ridge portion contacts the mounting surface and is deflected and compressed to apply a reaction force on the suspension spring when the spring load is applied on the lower-side spring-receiving member.

According to the present invention, because the lower-side spring-receiving member has a shape having a part of a circular ring, i.e., a partially annular shape, an amount of material used for manufacturing is smaller than that of an entire annular shape. As a result, reductions in weight and manufacturing cost may be achieved. In addition, the lower-side spring-receiving member is provided with the base end portion, the slope portion, and the holding portion, and further the recess portion is also formed on the bottom side of the slope portion. This results in enabling higher degree of followability of the lower-side spring-receiving member against the deformation of the suspension spring. Furthermore, the present invention enables to prevent a gap from being formed between the suspension spring and the lower-side spring-receiving member. Such a configuration results in an effect of preventing foreign matter such as sand and gravel from entering.

In addition, a ridge portion is appropriately provided in the recess portion, and thus, as shown in FIG. 7A, for the same load as in the comparative example, the appropriately provided ridge portion can be smaller in a compression amount, i.e., a deflection amount and more difficult to be compressed than the comparative example; and also, can apply a larger reaction force to the suspension spring than the comparative example for the same deflection amount. This enables further improvement of the followability of the lower-side spring-receiving member to the deformation of the suspension spring. In yet addition, because the magnitude of the load (reaction force) with respect to the deflection amount in the ridge portion of the lower-side spring-receiving member does not rapidly increase, the bottom-touching uncomfortableness can be reduced. This results in an effect of further improvement in a drive feeling of crew members.

In addition, the recess portion includes a plurality of the ridge portions that are different from one another in a height or a shape in the cross-sectional view taken along the radial direction.

Such a configuration provides an effect of appropriately adjusting the magnitude of the reaction force applied to the suspension spring by the lower-side spring-receiving member accompanying the deformation in the lower-side spring-receiving member (see graphs of the embodiment and modification in FIG. 7A). In addition, the plurality of ridge portions having different heights or shapes in a cross-sectional view taken along a radial direction provided to the recess portion provides an effect of achieving much better followability of the lower-side spring-receiving member to the deformation of the suspension spring; and an additional effect of reducing, for example, the bottom-touching uncomfortableness to further improve the drive feeling of the crew members.

In addition, the ridge portion has a shape in which its width in the cross-sectional view taken along the radial direction increases in an upward direction so that a magnitude of the reaction force applied to the suspension spring gradually increases as the ridge portion is further compressed.

Such a configuration provides an effect of increasing the magnitude of the reaction force applied to the suspension spring by the lower-side spring-receiving member as the deformation amount of the lower-side spring-receiving member increases; and an additional effect of achieving a further better followability of the lower-side spring-receiving member with respect to the deformation of the suspension spring; and the effects described above finally result in an effect of further reducing the bottom-touching uncomfortableness to improve the drive feeling of the crew members.

In addition, the recess portion may be configured to have a substantially wedge shape, a substantially rhombic shape, or a substantially rectangular shape.

Such a configuration enables making a strength of a wall portion (to be described below) as desired to achieve a much better followability of the lower-side spring-receiving member with respect to a contraction deformation of the suspension spring; and in addition enables a recession to a degree of an recessed volume corresponding to the shape of the recess portion. That is, in reference to the characteristic diagrams shown in FIGS. 7A and 7B, a combination of a cross-sectional shape of the recess portion in the radial direction and a shape of a bottom side of the lower-side spring-receiving member is selected so that the deflection amount with respect to the load is optimized, and this results in an action and effect of achieving a further better followability of the lower-side spring-receiving member with respect to the deformation of the suspension spring; and an effect of further improving the drive feeing of the crew members.

In addition, the recess portion is provided with a wall portion having a shape extending in a radial direction.

Such a configuration enables further improvement of the followability of the lower-side spring-receiving member with respect to the deformation of the suspension spring by the wall portion provided in the recess portion. This results in further improvement of the drive feeling of the crew members.

In addition, the wall portion may be included inside the recess portion.

Such a configuration enables achieving the same effect as the above-described wall portion; that is, the effect of further improving the followability of the lower-side spring-receiving member with respect to the deformation of the suspension spring; and also an effect of further improving the drive feeling of the crew member.

Advantageous Effects of Invention

According to the present invention, a lower-side spring-receiving member that receives the suspension spring without causing a gap to be formed between the suspension spring and the lower-side spring-receiving member and reduces the bottom-touching uncomfortableness.

BRIEF DESCRIPTION OF DRAWINGS

FIG. 3A is a bottom perspective view of the lower-side spring-receiving member according to the embodiment of the present invention; FIG. 3B is a bottom surface enlarged view of a slope portion of FIG. 3A; FIG. 3C is a modification example of the bottom surface shown in FIG. 3B; FIG. 3D is another modification example of the bottom surface shown in FIG. 3B; and FIG. 3E is a cross sectional view taken along an arrow C-C of FIG. 3B.

FIG. 4A shows a diagram illustrating a state before a spring load is applied and FIG. 4B shows a diagram illustrating a state after a spring load is applied.

FIGS. 5A to 5G each is a cross-sectional view corresponding to FIG. 3E and illustrates a cross-sectional shape of a lower-side spring-receiving member according to a modification example of the embodiment of the present invention.

DESCRIPTION OF EMBODIMENT

Figure 1:
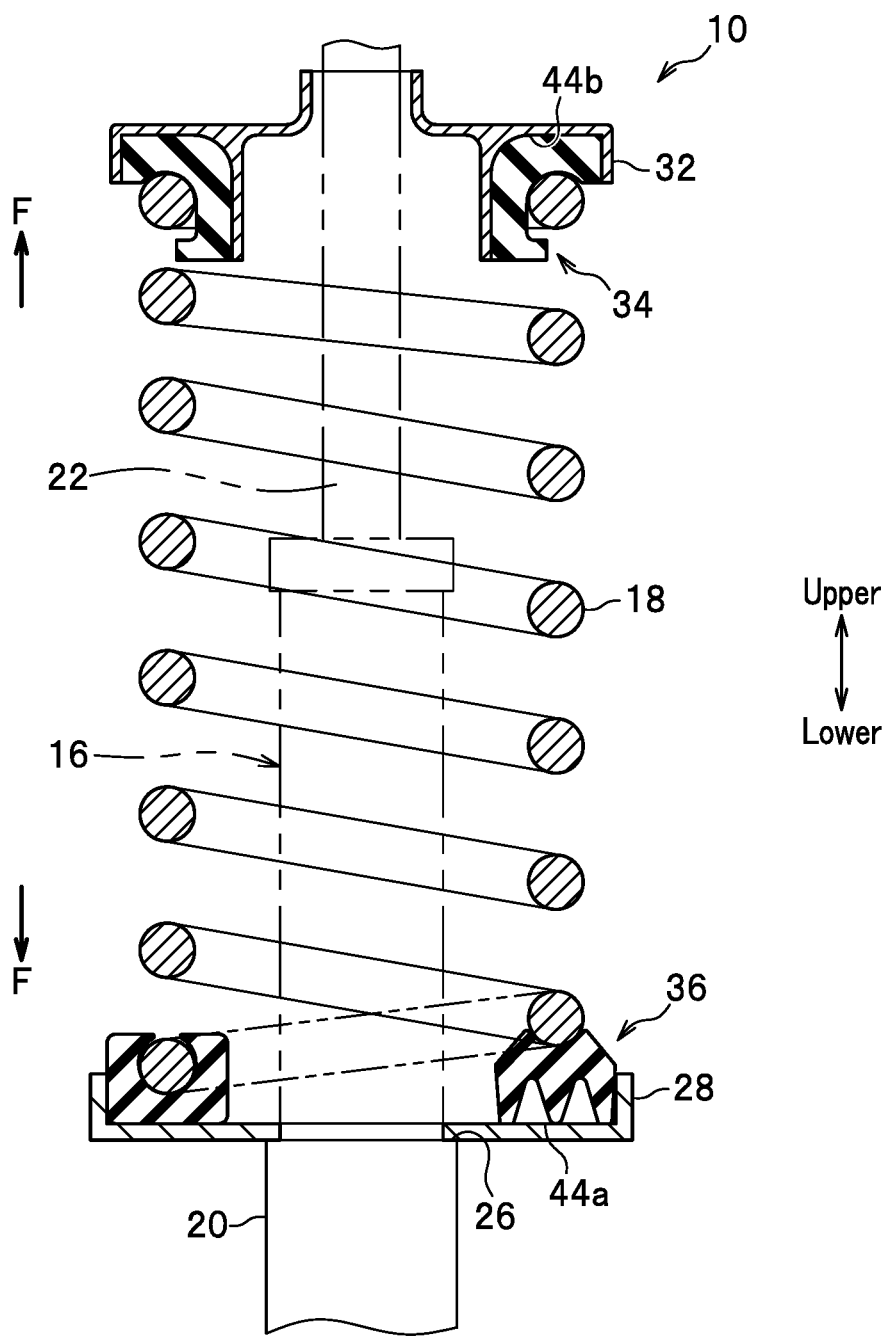
FIG. 1 is a cross-sectional view of a suspension device including a lower-side spring-receiving member according to an embodiment of the present invention, and is also a diagram for describing a schematic configuration.

Now, a description is given of a lower-side spring-receiving member according to an embodiment of the present invention, taking a case in which the lower-side spring-receiving member is provided on a suspension device of an automobile as an example, with reference to the drawings appropriately as needed. It should be noted that this is merely an example of the embodiment. That is, the embodiment of the present invention can be applied to any vehicles equipped with a suspension device such as a two-wheeled automobile, an aircraft, an industrial machine such as a snow-compacting car, an agricultural machine, and MTB (mountain bike) and the like. In addition, it may be applied to a base isolation device or the like.

Further, for convenience of explanation, the same members in the respective drawings are given the same reference numerals so that redundant explanations are omitted. In addition, in order to simplify the diagrams to make it easy to understand, descriptions of elemental components are partially omitted in each diagram. Direction axes for front and rear, top and bottom, and right and left are described in each drawing.

In addition, in the following description, "a spring load of the lower-side spring-receiving member is OFF" (or, "before the spring load is applied") means a state in which the lower-side spring-receiving member is not mounted with a suspension spring 18 (see FIG. 1 described below for details) or a state in which the lower-side spring-receiving member is mounted with a suspension spring 18 and only a load corresponding to a vehicle weight is applied. In addition, "the spring load of the lower-side spring-receiving member is ON" (or "after the spring load is applied") means a state in which the suspension spring 18 is mounted on the lower-side spring-receiving member and a load greater than at least the vehicle weight is applied on the suspension spring and the suspension spring 18 compresses.

DESCRIPTION OF EMBODIMENT

FIG. 1 is a cross-sectional view showing a schematic configuration of a suspension device including a lower-side spring-receiving member according to an embodiment of the present invention.

As shown in FIG. 1, the suspension device 10 includes a shock absorber 16 and a suspension spring 18 suspended along an axial direction of the shock absorber 16. And, the suspension device 10 includes an upper-side spring-receiving member 34 and a lower-side spring-receiving member 36 that receive a spring load F (see, for example, FIGS. 2A and 4B described below), respectively at an upper end and a lower end portion of the suspension spring 18. Note that the cross-sectional shape of the lower-side spring-receiving member 36 shown in FIG. 1 corresponds to a cross sectional view taken along an arrow A-A in FIG. 2A described below.

The shock absorber 16 is a device that attenuates vibration by performing motions of extension and contraction in conjunction with a movement of the suspension spring 18 absorbing an impact force by an elastic force when a vehicle receives the impact force from a road surface. The shock absorber 16 includes components (not shown), for example, a piston and a piston valve mechanism. These components generate a damping force in conjunction with the motions of extension and contraction, which damping force suppresses amplitude of the motions of extension and contraction.

In addition, the shock absorber 16 includes an outer tube 20 and a piston rod 22. The outer tube 20 is a cylindrical body and is equipped on the lower side. The piston rod 22 has one end housed inside the outer tube 20 and the other end protruding over a top of the outer tube 20.

In yet addition, an annular step portion 26 is formed on the outer peripheral surface of the outer tube 20 of the shock absorber 16. And a lower spring seat 28 is provided such as to be engaged with the annular step portion 26. Further, an upper spring seat 32 is provided to the piston rod 22 so as to form a pair with the lower spring seat 28. A suspension spring 18 is suspended between the lower spring seat 28 and the upper spring seat 32. A lower-side spring-receiving member 36 is interposed between the lower spring seat 28 and the lower end portion of the suspension spring 18. An upper-side spring-receiving member 34 is interposed between the upper spring seat 32 and an upper end portion of the suspension spring 18.

As shown in, for example, FIG. 1, the lower end portion of the suspension spring 18 is supported by a support surface 44a of the lower spring seat 28 via the lower-side spring-receiving member 36; and the upper end portion of the suspension spring 18 is supported by a support surface 44b of the upper spring seat 32 via the upper-side spring-receiving member 34. That is, the lower-side spring-receiving member 36 and the upper-side spring-receiving member 34 are members that function as a mounting member that receives the spring load F of the suspension spring 18. In the description below, a term "support surface 44", when not particularly mentioned, refers to the support surface 44a. Details of the lower-side spring-receiving member 36 are described below when FIG. 2 is explained and thereafter.

Note that the lower-side spring-receiving member 36 receives the elastic force generated by the suspension spring 18 and is supported by the support surface 44 and the suspension spring 18 therebetween.

Figure 2A:
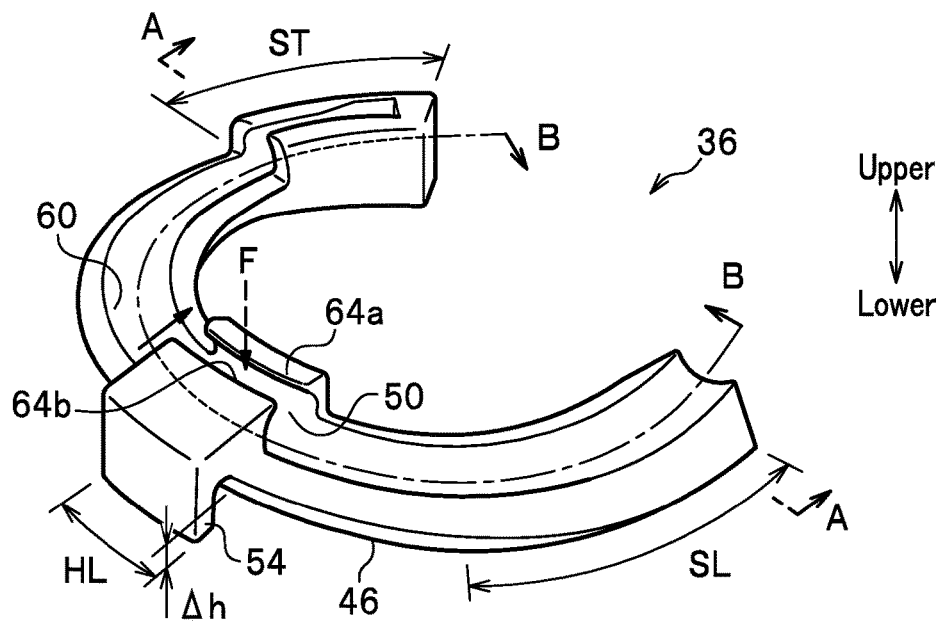
FIG. 2A is a top perspective view of the lower-side spring-receiving member according to the embodiment of the present invention.
Figure 2B:
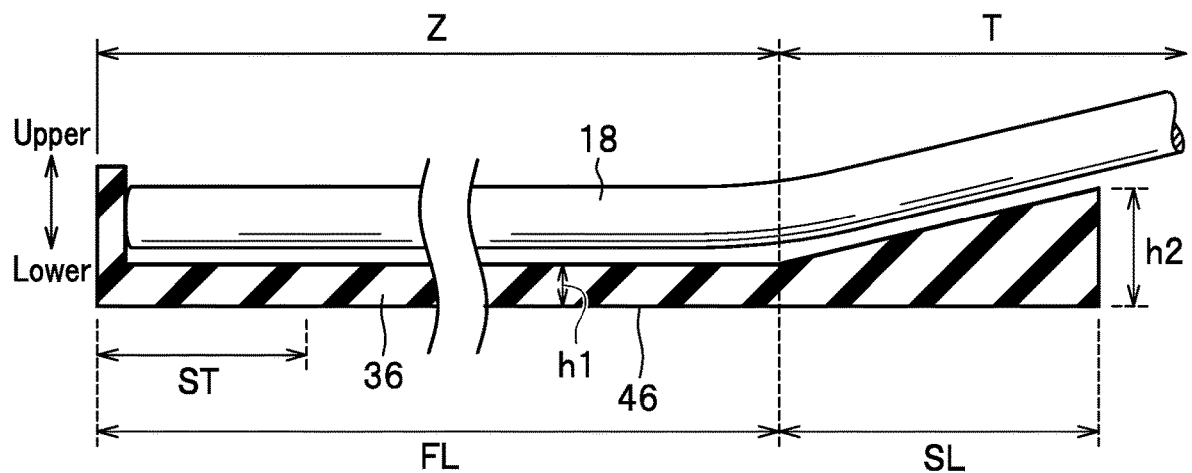
FIG. 2B is a cross-sectional view taken along line B-B in FIG. 2A.

FIGS. 2A and 2B are views showing an upper side surface of the lower-side spring-receiving member according to the embodiment of the present invention; FIG. 2A is a perspective view, and FIG. 2B is a cross-sectional view taken along a line B-B of FIG. 2A.

As shown in FIG. 2A, the lower-side spring-receiving member 36 has a shape exhibiting a part of a circular ring (partially annular shape); and a curved surface 60 that is a guide surface in contact with the suspension spring 18. The curved surface 60 has a diameter substantially the same as a spring diameter of the suspension spring 18 in a top view and is a smooth surface formed so as to cave in an annular shape. The lower-side spring-receiving member 36 has a base end portion ST formed on one end of the lower-side spring-receiving member and a slope portion SL formed on the other end of the lower-side spring-receiving member; and a spring holding portion HL between the base end portion ST and the slope portion SL. An end portion of the suspension spring 18 is inserted and interposed by pressing into the base end portion ST. The base end portion ST of the lower-side spring-receiving member 36 is formed in a wall shape with an opening that is formed by cutting out an upper portion (hereinafter referred to as "cutout opening"), and holds the end portion of the suspension spring 18 from both sides of the base end portion ST. In addition, the above-described cutout opening of the base end portion ST has a shape in which end portions of the cutout opening is expanded toward both sides. This facilitates an insertion of the end portion of the suspension spring 18 into the cutout opening, i.e., the base end portion ST of the lower-side spring-receiving member 36, from an upper side of the lower-side spring-receiving member 36; and further, facilitates pressing and interposing the suspension spring 18 into the curved surface 60 that is a guide surface curved in a substantially annular circle while rotating the suspension spring 18 in a direction along the surface of the lower-side spring-receiving member 36 (a direction along the curved surface 60) around a point against which a tip of the end portion the suspension spring 18 contacts. When interposing the suspension spring 18, because the cutout opening is configured to be gradually narrowed, the lower-side spring-receiving member 36 into which the suspension spring 18 is interposed has a high holding performance of the suspension spring 18. Details of the slope portion SL and the spring holding portion HL of the lower-side spring-receiving member 36 are described below.

The length from the one end to the other end of the lower-side spring-receiving member 36 is not specifically limited, but configured so as to be a length corresponding to, for example, approximately 0.6 to 0.7 turns of the suspension spring 18. In the present embodiment, however, the suspension spring 18 includes a rising portion T (detailed later) that rises at a predetermined slope in a spiral shape. In other words, a portion on and after the rising portion T of the suspension spring 18 has a height that is considerably far apart from the support surface 44 of the lower spring seat 28. Therefore, the length from the one end to the other end of the lower-side spring-receiving member 36 of this embodiment can be shorter than a length corresponding to one turn of the suspension spring 18. This may result in a reduction of production cost such as material cost; and improving productivity by reducing manufacturing steps and shortening a manufacturing time.

Next, with reference to FIG. 2A, a function of the spring holding portion HL is explained.

The spring holding portion HL includes a bottom surface portion 46 having a flat surface, and a first and second extending portions 64a and 64b that are provided on an outer peripheral edge of the bottom surface portion 46 outside an periphery of the suspension spring 18 and extend from the outer peripheral edge of the bottom surface portion 46 toward the suspension spring 18.

In addition, the spring holding portion HL also includes a first protruding portion 54 that protrudes by a predetermined length Δh (also see FIG. 3) from the bottom surface portion 46 toward the support surface 44 of the lower spring seat 28 (see FIG. 1) under a position where the second extending portion 64b is provided.

In addition, an inner peripheral surface that contacts the suspension spring 18 includes a curved surface 60 formed so that the suspension spring 18 can be interposed.

It should be noted that the first extending portion 64a and the second extending portion 64b form a pair and are disposed so as to face each other so that the suspension spring 18 does not get out from the spring holding portion HL (so that the suspension spring 18 does not get away from the curved surface 60).

When the lower-side spring-receiving member 36 is mounted on a vehicle and the suspension spring 18 repeats extension and contraction due to, for example, vibration caused by unevenness of a road surface, the suspension spring 18 has an elastic force (spring force) generated accompanying the motion of extension and contraction. That is, a spring load F (see a broken line arrow in FIG. 2A) is generated, which load F presses the bottom surface portion 46 toward the support surface 44 (see FIG. 1) of the lower spring seat 28.

As a result, the second extending portion 64b formed above the first protruding portion 54 is displaced toward the first extending portion 64a, such that a width (spacing interval) of an opening portion 50 of the inner peripheral surface of the spring holding portion HL is narrowed (see a solid arrow in FIG. 2A). That is, when the spring load F is applied on the spring holding portion HL, the first extending portion 64a and the second extending portion 64b are non-elastically-deformable in a direction in which the opening portion 50 closes. This results in increasing the holding force against the suspension spring 18.

Next is an explanation of FIG. 2B, which is a cross-sectional view taken along the line B-B in FIG. 2A. Here, the line B-B is a line tracing the bottom portion of the curved surface 60 that is formed to be curved so as to contact and guide an annular outer periphery of the suspension spring 18 when the suspension spring 18 is mounted on the lower-side spring-receiving member 36. For reference, a sectional view of the suspension spring 18 is also shown.

As shown in FIG. 2B, the suspension spring 18 according to the embodiment includes an end turn portion Z that is disposed so as to keep parallel to the support surface 44 of the lower spring seat 28 and is non-elastically-deformable. In addition, the suspension spring 18 includes a rising portion T rising from the end turn portion Z at a predetermined slope. Here, the end turn portion Z of the suspension spring 18 is not limited to have a specific length, but in the present embodiment, formed to have a length corresponding to, for example, approximately 0.5 turns (half a circle).

Further, the lower-side spring-receiving member 36 is interposed between the suspension spring 18 and the support surface 44 of the lower spring seat 28 having the above-described shape (see FIG. 1). As shown in FIG. 2B, the lower-side spring-receiving member 36 has a shape corresponding to the shape of the suspension spring 18, the shape extending from the end turn portion Z to the rising portion T. That is, the lower-side spring-receiving member 36 has a flat portion FL corresponding to the end turn portion Z of the suspension spring 18, which flat portion FL, including the base end portion ST, has a thickness of h1 that is substantially uniform in a cross sectional view. And, a portion corresponding to the rising portion T is a slope portion SL, which has a cross-sectional view of substantially slope shape inclined with respect to the bottom surface portion 46 (described below for details) and has a thickness gradually increasing from h1 to h2. Note that h1<h2. In this way, the lower-side spring-receiving member 36 includes the flat portion FL and the slope portion SL, and the slope portion SL is configured to vary in its thickness.

The embodiment of the present invention uses, for example, a rubber pad molded of an elastic member such as a hard rubber as the lower-side spring-receiving member 36, but note that material of the lower-side spring-receiving member 36 is not limited thereto.

Next, referring to FIGS. 3A to 3E, description is made of a structure of the lower-side spring-receiving member according to the embodiment of the present invention when viewed from the bottom side. Here, FIG. 3A is a perspective view; FIG. 3B is an enlarged view of a slope portion in FIG. 3A; FIG. 3C is a modification example of the slope portion shown in FIG. 3B; FIG. 3D is another modification example of the slope portion shown in FIG. 3B; FIG. 3E is a cross-sectional view taken along an arrow C-C in FIG. 3B.

As shown in FIG. 3A, the lower-side spring-receiving member 36 according to the embodiment of the present invention includes a bottom surface portion 46 that is formed to parallelly contact the support surface 44 of the lower spring seat 28 (see FIG. 1) and substantially flat. This bottom surface portion 46 enables the lower-side spring-receiving member 36 not to float with respect to the above-mentioned support surface 44 to receive the suspension spring 18 stably when the spring load F is applied on the lower-side spring-receiving member 36 from the suspension spring 18.

Further, the bottom surface portion 46 is formed to have widths in radial directions: a width W2 of the slope portion SL; a width W3 of the base end portion ST; and a width W1 of the flat portion FL except the base end portion ST, the width W1 being slightly narrower than the base end portion ST and the slope portion SL (i.e., W1<W2, W3). The above object is to solve a problem that the slope portion SL and the base end portion ST are larger than other portions of the bottom surface portion 46 in the magnitude of the spring load F received from the suspension spring 18. That is, as a received load is larger, the width of the bottom surface portion 46 in the radial direction is more widened so that the load can be received more evenly. Further, by widening more the radial direction width of and enlarging an area of the portion that receives a larger load in the bottom surface portion 46, more stable receipt of a large load can be done even if a deformation amount of the suspension spring 18 increases.

It should be understood that a relationship between the widths W2 and W3 is not specifically limited and both widths may be substantially equal (W2≈W3). The spring load F from the suspension spring 18, however, is applied on the base end portion ST slightly more largely than on the slope portion SL. Therefore, it is more preferable to make the width W3 slightly wider than the width W2 (W2≤W3).

Next, FIG. 3B shows an enlarged bottom view of the slope portion of FIG. 3A. The bottom surface portion 46 of the slope portion SL of the lower-side spring-receiving member 36 according to the embodiment has a wall portion K formed at an end of the slope portion SL, and a recess portion Nk (indicated by a thick solid line) formed inside the wall portion K (see FIG. 3E also for cross-reference). It should be noticed that the wall portion K exhibits a shape of spreading in a radial direction. A shape of the recess portion Nk is described below.

The wall portion K and the recess portion Nk are provided for a purpose of improving the deformation followability of the lower-side spring-receiving member 36, for example, even when the deformation amount in a downward direction of the suspension spring 18 increases. That is, for an example, even when the suspension spring 18 is supposed to repeat alternately large deformations of extension and contraction in a short time, depression deformation is achieved by the recess portion Nk. In the depression deformation, the lower-side spring-receiving member 36 is compressed and depressed immediately. Further, the wall portion K allows achieving return deformation in which the lower-side spring-receiving member 36 rapidly returns to a previous state before the depression occurs. As described above, the wall portion K and the recess portion Nk provided on the bottom side of the slope portion SL of the lower-side spring-receiving member 36 provides an action and effect in which the lower-side spring-receiving member 36 can follow a large deformation movement of the suspension spring 18 without any delay; and these action and effect do not provide a room for causing a gap to be formed between the lower-side spring-receiving member 36 and the suspension spring 18. If no gap is formed, foreign matter such as sand or gravel is never bitten between the suspension spring 18 and the lower-side spring-receiving member 36, which provides an effect of decreasing a possibility of corrosion and breakage occurring due to abrasion of the coating film of the suspension spring 18.

It should be understood that the wall portion K preferably has no communication hole perforated thereon that communicates with the recess portion Nk. The reason is because if no communication hole is bored, the strength of the wall portion K is increased, resulting in increasing a followability of return deformation of the lower-side spring-receiving member 36 to the contraction deformation of the suspension spring 18. However, the wall portion K is not limited specifically to the above preferable feature of the wall portion K.

Further, as indicated by a thick solid line in FIG. 3B, the recess portion Nk is formed, for example, along the circumferential direction of the lower-side spring-receiving member 36, and has a substantially wedge shape growing wider toward the end of the lower-side spring-receiving member 36. In other words, the recess portion Nk is of a substantially wedge form and has a shape in which its center line passing its top is curved such as to be equivalent to a curvature of a center line of the bottom surface portion 46. A specific recess shape of the recess portion Nk may be formed in a shape in which, for example, a ridge portion Rd forming a projection portion and trough portions Tr forming a valley portion are formed in a part of the recess portion (for details, refer to FIG. 3E described below); but is not limited thereto.

Furthermore, a modification of the recess portion of FIG. 3B is shown in FIG. 3C, and another modification of the recess portion of FIG. 3B is shown in FIG. 3D. The recess portion Nk1 of FIG. 3C has a substantially rhombic shape as a whole, and is formed by replacing a portion near the wall portion K of the recess portion Nk of FIG. 3B with a wedge-shape portion similar to a reversed shape of the recess portion Nk in FIG. 3B. Other features of the recess portion Nk1 of FIG. 3C are the same as those of the recess portion NK in FIG. 3B. Further, on the contrary to FIG. 3C, the recess portion Nk2 shown in FIG. 3D has a substantially rectangular shape as a whole, and is formed by replacing the wedge-shape portion at a top side of the recess portion Nk of FIG. 3B with a substantially rectangular shape similar to the shape of the portion near the wall portion K of the recess portion Nk of FIG. 3B. Other features of the recess portion Nk2 of FIG. 3D are the same as those of the recess portion Nk of FIG. 3B. Such a recess portion Nk2 may be used.

As described above, the recess portion Nk may be formed to exhibit, for example a substantially wedge-like shape, a substantially rhombic shape, or a substantially rectangular shape. In this way, the strength of the wall portion K can be as desired strength, and the preferable return deformation of the lower-side spring-receiving member 36 following the contraction deformation of the suspension spring 18 can be achieved. Further, because the lower-side spring-receiving member 36 can be recessed by a recessed volume determined by the shape of the recess portion Nk, the preferable depression deformation of the lower-side spring-receiving member 36 can be achieved in response to the extensional deformation of the suspension spring 18.

Figure 7A:
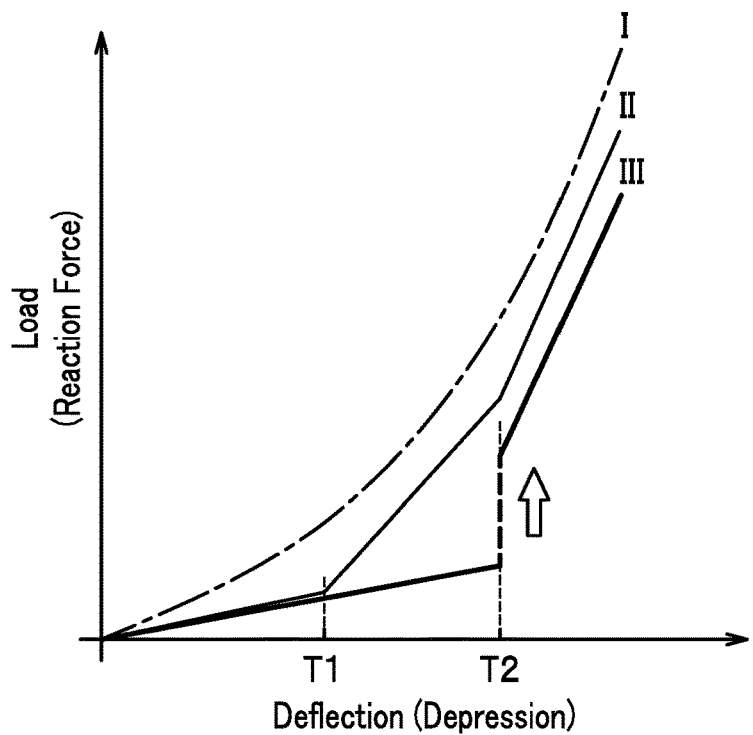
FIG. 7A is a graph showing a load-deflection characteristic of the lower-side spring-receiving member according to the embodiment of the present invention illustrated by FIG. 3E, the modification example illustrated by FIG. 5A, and the comparative example.
Figure 7B:
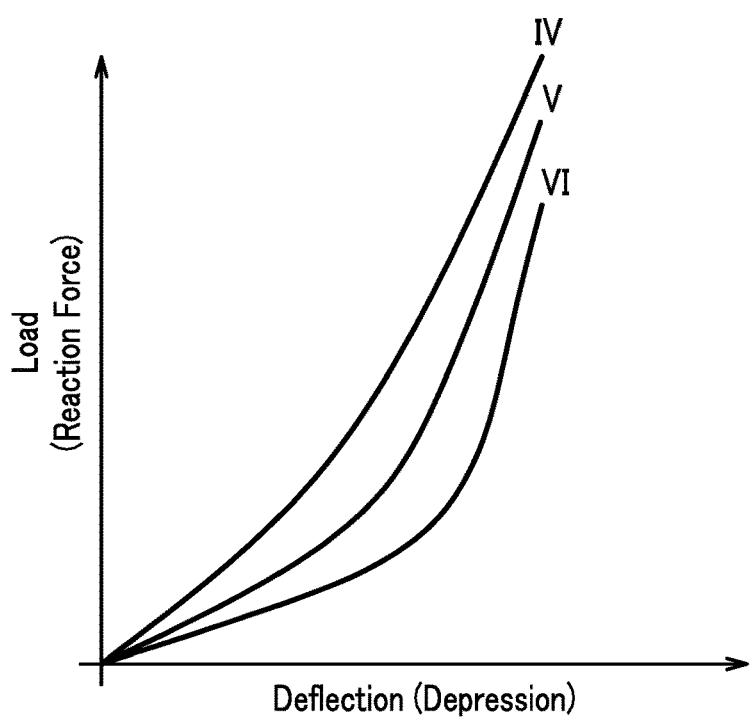
FIG. 7B is a graph showing load-deflection characteristics of the lower-side spring-receiving members according to the embodiment of the present invention illustrated in FIG. 3B, the modification example illustrated in FIG. 3C, and the modification example illustrated in FIG. 3D.

A load-deflection characteristic diagram for each case shown in FIG. 3B, FIG. 3C, and FIG. 3D is shown respectively in each graph of (V), (IV), and (VI) in FIG. 7B. FIG. 7B shows a tendency that the magnitude of the reaction force applied gradually increases as the recessed volume decreases, for example, in an order of FIG. 3D>FIG. 3B>FIG. 3C, for the same amount of deflection. Further, as the recessed volume becomes smaller, the magnitude of the reaction force to the maximum amount of deflection gradually increases. This means that an appropriate selection of the shape of the recess portion having a desired load-deflection characteristic provides an action and effect of further improving the followability of the lower-side spring-receiving member 36 to the suspension spring 18; and in addition, an effect of improving the drive feeling of crew members and reducing a feeling such as bottom-touching uncomfortableness.

Next, with reference to FIG. 3E, description is given of a specific recess shape of the recess portion Nk. FIG. 3E shows a cross-sectional view taken along an arrow line, for example, C-C of FIG. 3B, D-D of FIG. 3C, and E-E of FIG. 3D.

The recess portion Nk may be formed in a shape in which, for example, the ridge portion Rd forming a projection portion has both sides formed with trough portions Tr forming valley portions in a cross-sectional view.

Here, the ridge portion Rd is formed to be in contact with the support surface 44 of the lower spring seat 28 (see FIG. 1), but not specifically limited thereto. However, the above-described shape in which the ridge portion Rd is formed to be in contact with the support surface 44 allows the spring load F to be received by three points of the right and left side walls S1, S2 and the ridge portion Rd of the lower-side spring-receiving member 36 (for details, see FIG. 4B). This case is preferable to the case of two-point support (no support by the ridge portion Rd) in the following specific points: providing an effect of making the crew member feel none of the bottom-touching uncomfortableness because the three-point support more gradually increases the reaction force applied on the suspension spring 18 than the two-point support when the lower-side spring-receiving member 36 is compressed by depression deformation thereof (i.e., unlike the graph (III) of the comparative example in FIG. 7A in which the reflection force abruptly increases at a deflection amount T2, the reflection force gradually and smoothly increases as a whole as illustrated by the one dot chain line (I) in FIG. 7A). Thus, the drive feeling can be improved. Further, an effect of restricting the lower-side spring-receiving member 36 from compressing at an oblique angle due to the spring load F is suppressed. Furthermore, because the recessed volume is smaller than the comparative example, the magnitude of the reaction force for the maximum deflection amount can be larger than that of the comparative example.

Note that when the trough portion Tr is formed by recessing, chamfering process is preferably performed so that the trough portion Tr has a corner shaped in round. Such a chamfering process prevents cracks from being formed at the trough portion Tr to avoid the lower-side spring-receiving member 36 from being ruptured.

Figure 4A:
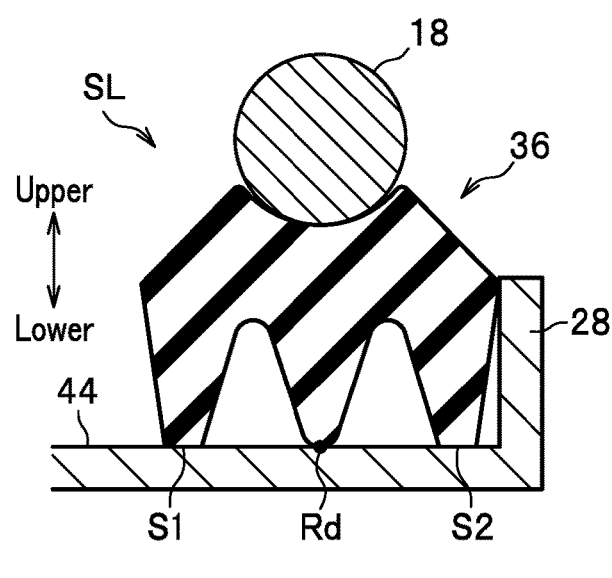
FIGS. 4A and 4B are cross-sectional views of a case where a suspension spring is assembled to the recess portion in FIG. 3E.
Figure 4B:
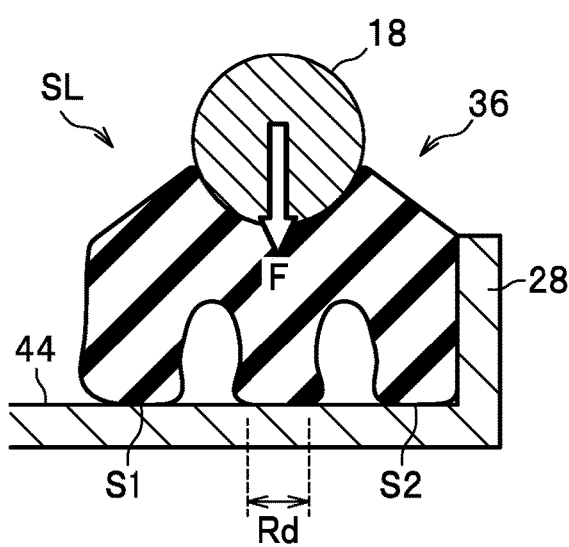

Next, referring to FIGS. 4A and 4B, description is given of a function of the slope portion SL of the lower-side spring-receiving member 36. FIGS. 4A and 4B are cross-sectional views when the suspension spring is assembled onto the lower-side spring-receiving member 36 in FIG. 3E; FIG. 4A shows a state before a spring load is applied; and FIG. 4B shows a state after the spring load is applied.

FIG. 4A shows a case before the lower-side spring-receiving member 36 is mounted on a vehicle. In this case, the lower-side spring-receiving member 36 is in contact with the support surface 44 of the lower spring seat 28 on three points: the side walls S1 and S2, and the protrusion portion, i.e., the ridge portion Rd. The ridge portion Rd according to the embodiment is adapted to have a substantially mountain shape in a cross sectional view in the radial direction as described above. That is, the ridge portion Rd has a shape in which a width of a cross-sectional surface when being cut at a plane parallel to the support surface 44 of the lower spring seat 28 gradually increases in an upward direction.

When the spring load F is applied onto the lower-side spring-receiving member 36 that has been in the above state, the lower-side spring-receiving member 36 is pressed downward and the right and left side walls S1 and S2 and the ridge portion Rd are compressed. At this time, the ridge portion Rd is in surface-contact with the support surface 44 at a predetermined width in a cross-sectional view (a state of FIG. 4A appears as in line-contact in a cross-sectional view). As described above, the cross sectional width (lateral width) of the ridge portion Rd gradually increases toward the upper side. Therefore, even if the deflection of the lower-side spring-receiving member 36 can have been temporarily neglected, as the extension deformation of the suspension spring 18 increases, the width (lateral width) by which the ridge portion Rd contacts with the support surface 44 increases. This may make the lower-side spring-receiving member 36 of the present embodiment surface-contact with the support surface 44 by an area corresponding to the magnitude of the spring load F, and gradually increase the reaction force to the suspension spring 18 so as to be less likely to be compressed.

The above features of the embodiment provides an action and effect that the lower-side spring-receiving member 36 can follow even an abrupt short-time shift of the deformation of the suspension spring 18 from extension to contraction of returning to the original shape without causing a gap to be formed between the suspension spring 18 and the lower-side spring-receiving member 36, and leading to an effect of preventing foreign matter such as sand and gravel from being bitten between the suspension spring 18 and the lower-side spring-receiving member 36, and further an effect of preventing abrasion of coating and an occurrence of corrosion and breakage due to the abrasion of coating.

In addition, because the followability of the lower-side spring-receiving member 36 responding the deformation of the suspension spring 18 is improved, there is provided with an action and effect of reducing the bottom-touching uncomfortableness that a crew member receive from the vehicle, and improving the drive feeling.

Specifically explaining, for example, if no ridge portion Rd is provided, when the lower-side spring-receiving member 36 is compressed such that an upper side surface of the recess portion Nk contacts the support surface 44, a reaction force to the suspension spring 18 is jumped up to provide the bottom-touching uncomfortableness to the crew member.

On the other hand, the lower-side spring-receiving member 36 according to the embodiment is provided with the ridge portion Rd in the recess portion Nk. In such a configuration, although the ridge portion Rd is compressed when the lower-side spring-receiving member 36 is compressed, the reaction force applied to the suspension spring 18 becomes larger as the compression of the ridge portion Rd reaches closer to its root, i.e., the ridge portion Rd is compressed more deeply. That is, because the reaction force to the suspension spring 18 gradually increases due to the ridge portion Rd when the lower-side spring-receiving member 36 according to the embodiment is compressed, this provides an action and effect of making the crew members hardly having the bottom-touching uncomfortableness comparing the previous case of no ridges.

FIGS. 5A to 5G are diagrams showing cross-sectional shapes of modifications of the lower-side spring-receiving member according to the embodiment of the present invention, and each is a cross-sectional view of a portion corresponding to the portion shown in FIG. 3E. Note that an illustration of the support surface 44 of the lower spring seat 28 (see FIG. 1) is omitted.

As shown in FIGS. 5A to 5G, the cross-sectional shape of the slope portion SL of the lower-side spring-receiving member 36 according to the present embodiment may have various modifications thought of. The following description of each modification focuses on a difference from the other modifications of the lower-side spring-receiving member.

In a lower-side spring-receiving member 36A shown in FIG. 5A, as compared to the lower-side spring-receiving member 36 shown in FIG. 3E, a ridge portion Rd1 corresponds to the ridge portion Rd; Rd1 is lower than Rd in height; and Rd1 is not in contact with the support surface 44 when the spring load F is not applied. In this case, as shown by a thin solid line (II) in FIG. 7A, when the spring load F is applied, the ridge portion Rd1 is depressed until contacting the support surface 44 (deflection amount: T1), and exhibits a load-deflection characteristic such that an elastic modulus gradually increases bit-by-bit after the ridge portion Rd1 contacts the surface 44. That is, FIG. 7A shows that the lower-side spring-receiving member 36A shown in FIG. 5A is depressed more gracefully than the lower-side spring-receiving member 36 of the embodiment shown in FIG. 3E. However, there is no leap point of the reaction force as seen in the comparative example (deflection amount: T2), and thus, the lower-side spring-receiving member 36A may provide the drive feeling without the bottom-touching uncomfortableness similarly to the lower-side spring-receiving member 36 of the embodiment of FIG. 3E. Further, because the lower-side spring-receiving member 36A is smaller than the comparative example in the recessed volume, the magnitude of the reaction force at the time of the maximum amount of deflection can be larger than that of the comparative example. Such a lower-side spring-receiving member 36A may be used. It should be understood that FIG. 7A shows a graph of the present modification according to the embodiment slightly shifted from a graph of the comparative example until the deflection point: T1, but these two graphs actually show substantially same characteristics of the present modification and the comparative example.

Next, in the lower-side spring-receiving member 36B shown in FIG. 5B, as compared to the lower-side spring-receiving member 36A, portions corresponding to the ridge portion Rd1 are ridge portions Rd2 and Rd3, that is, the number of ridge portions increases from one to two (or multiple). In this case, when the spring load F is applied, the ridge portions Rd2, the Rd3 are depressed until they contact the support surface 44, which results in a four-point support in which the right and left walls S1 and S2 and the ridge portions Rd2 and Rd3 support the suspension spring 18.

Consequently, the lower-side spring-receiving member 36B may provide a crew member with a drive feeling which give bottom-touching uncomfortableness more hardly than the lower-side spring-receiving member 36A, when the lower-side spring-receiving member is depressed. Such a lower-side spring-receiving member 36B may be used. Note that the heights of the ridge portions Rd2 and Rd3 are illustrated as substantially equal, but not particularly limited thereto; and that the number of the ridge portions is not limited to two and more than two ridge portions may be included.

Next, the ridge portion Rd4 of the lower-side spring-receiving member 36C shown in FIG. 5C, as compared to the ridge portion Rd of the lower-side spring-receiving member 36, includes an end tip formed in a sharp corner without being rounded. The lower-side spring-receiving member 36C having such a configuration may provide the crew members with substantially the same drive-feeling as the lower-side spring-receiving member 36, and may be used for a modification of the present embodiment.

Next, in the lower-side spring-receiving member 36D shown in FIG. 5D, as compared to the lower-side spring-receiving member 36A, the ridge portion Rd1 is replaced by the ridge portion Rd5, and the end tip of the ridge portion Rd1 having the substantially mountain shape in cross sectional view is replaced by a chevron with a sharp corner without rounded. And, another difference is in that side surfaces facing the ridge portion Rd5 among the side surfaces defining the right and left side walls S1 and S2 are formed to be substantially perpendicular to the support surface 44. The lower-side spring-receiving member 36D having such a configuration may provide the crew member with substantially the same drive-feeling as the lower-side spring-receiving member 36A, and may be used for a modification of the present embodiment.

Next, in the lower-side spring-receiving member 36E shown in FIG. 5E, as compared to the lower-side spring-receiving member 36D, the ridge portion Rd5 that is configured to line-contact with the support surface 44 is replaced by the ridge portion Rd6 that is configured to surface-contact with the support surface 44 in the ON state of the spring load F. Note that a width of the cross-sectional surface when cutting the ridge portion Rd6 in a cutting plane parallel to the support surface 44 of the lower spring seat 28 is a predetermined constant width independent on the height of the cutting plane. When the spring load F is applied on such a configuration of lower-side spring-receiving member 36E, the ridge portion Rd6 is depressed until the ridge portion Rd6 contacts the support surface 44, and exhibits a constant elastic modulus of a predetermined value after contacting the support surface 44. The lower-side spring-receiving member 36E may provide a crew member with a drive feeling which give bottom-touching uncomfortableness further reduced comparing to the lower-side spring-receiving member 36D, after the lower-side spring-receiving member 36E is brought into a three-point support status in which the spring load F is received on three points of the right and left side walls S1 and S2, and the ridge portion Rd6. Such a lower-side spring-receiving member 36B may be also used.

Next, the lower-side spring-receiving member 36F shown in FIG. 5F, as compared to the lower-side spring-receiving member 36E, is different in that the ridge portion Rd6 is replaced by a ridge portion Rd7. Note that a width of the cross-sectional surface when cutting the ridge portion Rd7 in a cutting plane parallel to the support surface 44 of the lower spring seat 28 is configured to gradually increase at a predetermined rate as advancing in a upper direction. That is, the ridge portion Rd7 has a tapered shape in a cross sectional view. It should be understood that the ridge portion Rd7 of the lower-side spring-receiving member 36F is configured to have both features of the respective ridge portions Rd5 and Rd6 of the lower-side spring-receiving members 36D and 36E. Such a lower-side spring-receiving member 36F may be used.

Next, the lower-side spring-receiving member 36G shown in FIG. 5G has a recessed shape of the recess portion Nk defining the right and left side walls S1 and S2 that are different from the lower-side spring-receiving member 36C. Specifically, the lower-side spring-receiving member 36G is recessed so that side surfaces facing the ridge portion Rd8 among the side faces defining the right and left side walls S1 and S2 are parallel with the side surfaces of the ridge portion Rd8. Such a configuration, even if there occurs a mode in which the lower-side spring-receiving member 36G is compressed in a direction oblique to the support surface 44, the tip of the ridge portion Rd8 is brought early into contact with the side walls S1 and S2, which restricts a further deformation in the right-left lateral direction. Note that the ridge portion Rd4 and the ridge portion Rd8 are adapted to exhibit substantially the same cross-sectional shapes. The lower-side spring-receiving member 36G having such a configuration enables restricting more strongly the lower-side spring-receiving member 36G from being compressed in the oblique direction than the lower-side spring-receiving member 36C, and thus, may provide a better drive feeling to the crew members. Such a lower-side spring-receiving member 36G may be used.

<Action and Effect>

Actions and effects of the lower-side spring-receiving member according to the embodiment are summarized as follows.

The lower-side spring-receiving member 36 according to the embodiment of the present invention is configured to include the flat portion FL and the slope portion SL, as shown in FIGS. 2A and 2B. The flat portion FL includes the base end portion ST, the spring holding portion HL. The base end portion ST of the lower-side spring-receiving member 36 is formed in a wall shape that has an opening formed by cutting out the upper portion of a mounting member to hold an end portion of the suspension spring 18 from both sides of the wall shape. Further, this opening has a shape in which end portions are widened toward both sides, which makes it easy to insert and interpose by pressing an end portion of the suspension spring 18.

Further, as shown in FIG. 2A, the spring holding portion HL is configured so that a distance between the first extending portion 64a and the second extending portion 64b can be narrowed when the spring holding portion HL receives a spring load F. In other words, as the spring load F is greater, the distance between the first extending portion 64a and the second extending portion 64b is adapted to be narrowed. This results in an action and effect of achieving a strong holding of the suspension spring 18.

Furthermore, as shown in FIG. 2B, the lower-side spring-receiving member 36 includes a slope portion SL having a slope shape in a cross sectional view and its thickness in a cross sectional view adapted to vary. In other words, the deformation followability of the lower-side spring-receiving member 36 with respect to the suspension spring 18 may be improved by changing the thickness of the lower-side spring-receiving member 36 accompanying with a shape of the suspension spring 18. This results in an effect of preventing the corrosion, breakage, and the like from occurring due to an abrasion of the coating caused by having sand and gravel into a gap between the suspension spring 18 and lower-side spring-receiving member 36.

Further, as shown in FIG. 3A, the bottom surface portion 46 of the lower-side spring-receiving member 36 according to the embodiment of the present invention is formed such that a width W1 of the flat portion FL except a width W2 of the slope portion SL and a width W3 of the base end portion ST is slightly narrower than the width of the slope portion SL and the base end portion ST (i.e., W1<W2, W3). This provides an action and effect such that a load can be received more evenly even if the magnitude of the load applied from the suspension spring 18 is different depending on a location.

Further, as shown in FIG. 3B to FIG. 3E, the bottom surface portion 46 of the slope portion SL of the lower-side spring-receiving member 36 according to the embodiment, has a wall portion K formed at an end of the slope portion SL, and a recess portion Nk (indicated by a thick solid line) formed inside the wall portion K. This provides an action and effect of providing no room causing a gap to be formed between the lower-side spring-receiving member 36 and the suspension spring 18. Forming no gap provides an action and effect of decreasing a possibility of corrosion and breakage occurring due to biting foreign matter such as gravel. In addition, the recess portion Nk may be formed in a shape in a cross-sectional view, in which, for example, the trough portions Tr forming valley portions are formed at both sides of the ridge portion Rd forming a projection portion. It may be enough for the recess portion Nk include at least one of ridge portion Rd that is in contact with the mounting surface on which the lower-side spring-receiving member 36 is placed and a ridge portion Rd that is not in contact with the mounting surface. Such a configuration allows receiving a large spring load F by at least three-point support by the right and left side walls S1 and S2 and the ridge portion Rd of the lower-side spring-receiving member 36. This enables more stable support than a two-point support. Consequently, any of the lower-side spring-receiving members according to the embodiment and its modifications of the present invention, as shown in FIG. 7A, provides an effect of enabling improvement of the driving feel of the crew members by gradually increasing the reaction force against the suspension spring 18 relative to the comparative example.

Above described embodiment and modifications are described in detail for easy understanding of the present invention, and do not necessarily limit the present invention to those including all the elements described above.

Further, some structures of one of the embodiments or modifications can be replaced by structures of another embodiment or modification, and a structure of an embodiment or modification can be added to structures of another embodiment or modification. Furthermore, some of the structures of embodiments or modifications can be added, deleted, or replaced with other structures.

Specifically, the lower-side spring-receiving member 36 according to the above embodiment is described such that the recess portion Nk is exemplified by the recess portion Nk, Nk1, or Nk2 illustrated respectively by FIG. 3B, FIG. 3C, and FIG. 3D, but the recess portion Nk is not limited thereto.

Figure 6A:
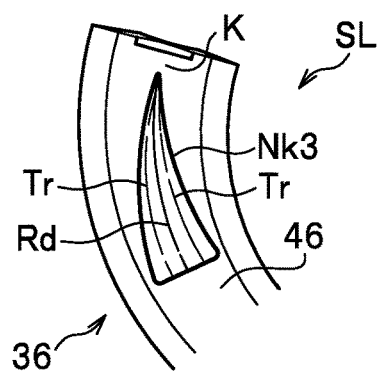
FIGS. 6A to 6F each is a bottom surface enlarged view of a portion corresponding to the bottom surface shown in FIG. 3B and illustrates a shape of a recess portion of the lower-side spring-receiving member according to the modification example of the embodiment of the present invention.

For example, as shown in FIG. 6A, a recess portion Nk3 may be used, which has a shape of the wedge whose direction is reversed to that of FIG. 3B. Specifically, this recess portion Nk3 may be formed such that a top of the wedge is reversed from that of FIG. 3B to be located near the end of the lower-side spring-receiving member 36.

Figure 6B:
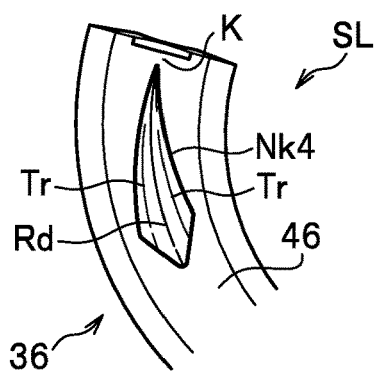

In the same manner as FIG. 6A, a recess portion Nk4 as shown in FIG. 6B may be used, which is in a shape that is reversed in its direction from that of the recess portion Nk1 shown in FIG. 3C. Specifically, the recess portion Nk4 may be formed such that a shape of a side of the recess portion Nk3 opposite to the wall portion K is made wedge-shaped like the top side of the recess portion Nk1 near the wall portion K and a whole shape of the recess portion Nk3 exhibits a rhombic shape. Other features of the recess portion Nk3 are the same as those of the recess portion Nk3 in FIG. 6A. Even such a recess portion Nk4 can provide the same effects as those provided by the embodiment.

Further, the wall portion K of FIG. 3B is described as being formed on one portion at the end of the slope portion SL of the lower-side spring-receiving member 36, but not particularly limited thereto. For example, as in a recess portion Nk5 shown in FIG. 6C, in addition to the wall portion K formed at the end of the slope portion SL, a wall portion Kα may also be provided inside the recess portion Nk in a manner of extending in a shorter side direction of the recess portion Nk. In other words, the recess portion Nk may be provided with the wall portions K and Kα of shape extending in a radial direction. Furthermore, the wall portion Kα may be provided at a plurality of locations. It should be noted that the recess portion Nk5 shown in FIG. 6C is formed by providing the wall portion Kα extending in the shorter side direction inside the recess portion Nk shown in FIG. 3B.

Consequently, by combining the embodiment and modifications of the recess portion Nk with the configuration of the wall portion Kα (two options of providing and non-providing), for example; five shapes of the recess portion Nk shown in FIGS. 3B to 3D and FIGS. 6A to 6B (Nk to Nk4); and eight types of radial cross-sectional shapes of the slope portion SL without taking into account the wall portions K and Kα, i.e., any one of 36 to 36G respectively shown in FIG. 3E, and FIG. 5A to FIG. 5G, the recess portion Nk can be configured in at least 80 types (2*5*8=80) as a whole. It should be understood that the wall portion K of FIG. 3B can be regarded to be located on the end of the slope portion SL and at the same time provided on a position of the end of the recess portion Nk.

Figure 6C:
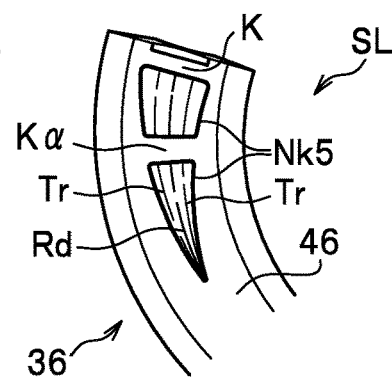
Figure 6D:
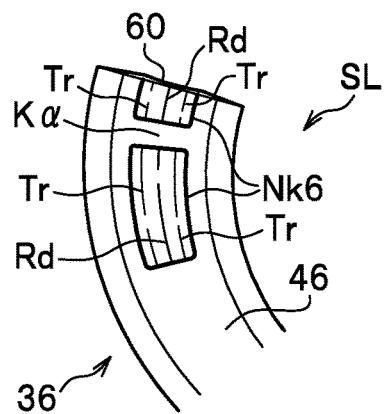

Furthermore, another modification of FIG. 6C, as shown by a recess portion Nk6 of FIG. 6D, may be configured to have the wall portion K formed at the end of the slope portion SL gotten rid of to include only the wall portion Kα provided inside the recess portion Nk. It should be understood that the recess portion Nk6 of FIG. 6D can be obtained from the recess portion Nk2 shown in FIG. 3D, by providing the wall portion Kα extending in the short side direction inside the recess portion Nk2 and getting rid of the wall portion K located on the end of the slope portion SL. Note that a recess portion having the wall portion Kα other than the recess portion Nk2 may be thought of a configuration having the wall portion K gotten rid of. That is, combinations of five kinds of recess portions Nk to Nk4 and eight cross-sectional shapes of 36 to 36G can configure forty (5*8=40) configurations in total, each of which is provided with the wall portion Kα and gotten rid of the wall portion K.

Figure 6E:
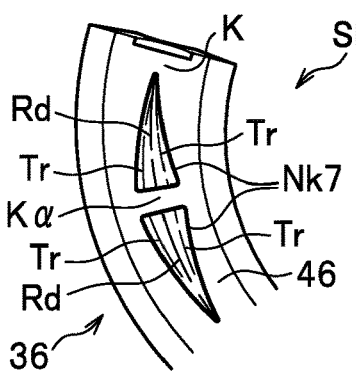

Further, as a recess portion Nk7 shown in FIG. 6E, the recess portion Nk3 of FIG. 6A and a recess portion different from the Nk3, for example, the recess portion Nk shown in FIG. 3B, both may be provided such as to sandwich the wall portion Kα.

The above modifications allow an adjusting the reaction force applied to the suspension spring 18 by ways such as increasing further a magnitude of the force, changing a position on which the reaction force is applied by providing the wall portions K and Kα to the recess portion Nk appropriately as needed, which, in other words, enables an adjustment so that of the lower-side spring-receiving member 36 can achieve a much better return deformation, following the contraction deformation of the suspension spring 18, thus such modifications are preferable.

Figure 6F:
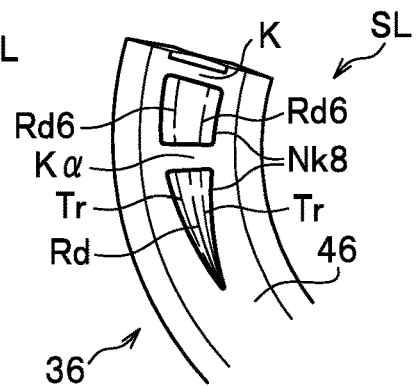

Furthermore, another modification example of the recess portion Nk5 shown in FIG. 6C may be configured, as shown in recess portions Nk8 of FIG. 6F, such as to include a recess portion Nk8 formed on both sides of the wall portion Kα in the circumferential direction, a combination of the recess portions, each having a cross sectional shape in the radial direction different from each other. Specifically describing, for example, the recess portion Nk5 shown in FIG. 6C and the recess portion Nk8 shown in and FIG. 6F have a common feature that their outer shapes are common in including the wall portion Kα in the substantially wedge-shaped inner portion. On the contrary, the recess portion Nk5 has a common cross-sectional shape taken in the radial direction on both sides of the wall portion Kα in the circumferential direction, for example, the ridge portion Rd of the embodiment shown in FIG. 3E is provided on the both sides. On the other hand, the recess portion Nk8 is provided with, for example, the ridge portion Rd6 shown in FIG. 5E near the end of the slope portion SL from the wall portion Kα; and the ridge portion Rd of the embodiment shown in FIG. 3E on the opposite side. Note that the combination of the ridge portions Rd6 and Rd is merely an example and the reverse order configuration may be allowed or a combination other than the above may be, of course, allowed. That is, at least $_8P_2=8\times7=56$ types of cross-sectional shape combinations of the above cases can be thought of (two-pair combination of cross-sectional shapes: 36 to 36G).

The above discussion can be summarized that the embodiments of the present invention are thought of at least 176 types of combinations (i.e., 80+40+56=176).

Further, FIGS. 5D to 5G show examples having one ridge portion among the ridge portions Rd5 to Rd8 respectively, but a configuration having a plurality of ridge portions may be allowable. Such a configuration can be made by combining a mix of ridge portions Rd, each having different features such as height and shape in the cross sectional view taken along the radial direction.

Figure 6G:
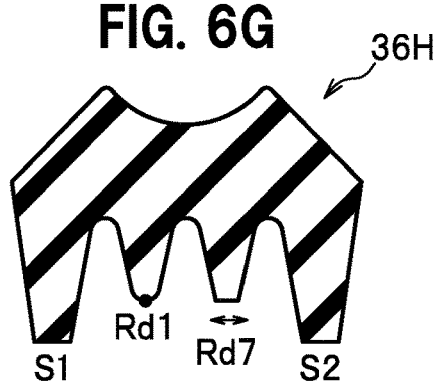
FIGS. 6G and 6H each is a diagram for explaining a further modification of FIGS. 5A to 5G.

Specifically, for example, a configuration may be made such that at least two or more of the ridge portions: Rd1, Rd5, Rd6, and Rd7 in FIGS. 5A, 5D, 5E, and 5F are included in one lower-side spring-receiving member 36. For example, as shown in FIG. 6G, the ridge portion Rd1 shown in FIG. 5A and the ridge portion Rd7 shown in FIG. 5F may be configured to be included in one lower-side spring-receiving member 36H. It should be understood that FIG. 6G may be regarded as a modification of the lower-side spring-receiving member 36B in FIG. 5B. In other words, FIG. 6G may be regarded to show a configuration example formed by a combination of various types of ridge portions Rd unlike FIG. 5B.

Figure 6H:
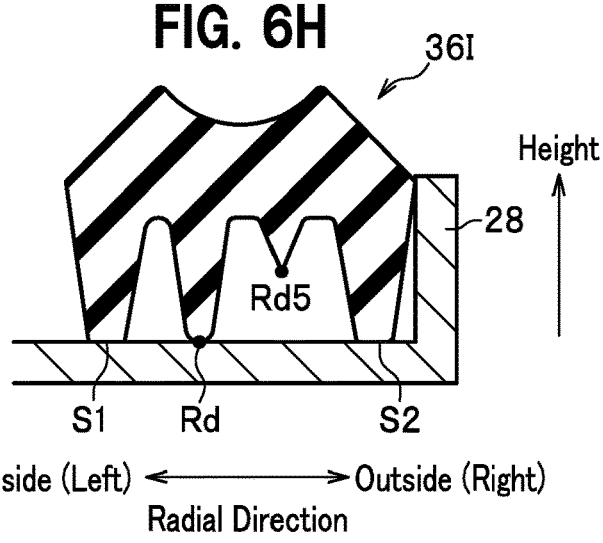

Further, other various types of configurations can be considered, for example, a configuration which includes the ridge portion Rd in FIG. 3E and any one of the ridge portions: Rd5, Rd6, and Rd7 in FIGS. 5D, 5E, and 5F in one lower-side spring-receiving member 36. In this configuration, for example, as shown in the lower-side spring-receiving member 36I of FIG. 6H, if a height of the ridge portion Rd that is positioned at a far side (i.e., inward in a radial direction) from the side wall of the lower spring seat 28 is made higher than that of the ridge portion near the side wall, the lower-side spring-receiving member 36 can be made stronger against a contraction in the radial direction, i.e., the right-left direction, and thus, this configuration is preferable. Note that FIG. 6H is a combination of the ridge portion Rd and the ridge portion Rd5, but the present invention may not be particularly limited thereto.

Consequently, the lower-side spring-receiving member 36 according to the embodiment of the present invention may achieve a much better followability to the deformation of the suspension spring by appropriately selecting a combination of a shape of a radial cross-sectional plane and a shape of the bottom side in the recess portion so that the deflection amount to the load is optimized, and also provides an action and effect of further improving the drive feeling of the crew members.

In addition, the spring-receiving member according to an embodiment of the present invention is described as a lower-side spring-receiving member 36, but may also be applied to the upper-side spring member 34. This case may be even more effective particularly for a vehicle having a lower vehicle height, because such a vehicle tends to be exposed under an environment in which sand or gravel relatively easily enter.

REFERENCE SIGNS LIST

10: suspension device
16: shock absorber
18: suspension spring
20: outer tube
22: piston rod
26: annular step portion
28: lower spring seat
32: upper spring seat
34: upper-side spring-receiving member
36, 36A, 36B, 36C, 36D, 36E, 36F, 36G, 36H, 36I: lower-side spring-receiving member
44, 44a, 44b: support surface (mounting surface)
46: bottom surface portion
50: opening portion
54: first protruding portion
60: curved surface
64a: first extending portion
64b: second extending portion
F: spring load
Z: end turn portion
T: rising portion
h1, h2: thickness
W1, W2, W3: width
ST: base end portion
HL: spring holding portion (holding portion)
SL: slope portion
FL: flat portion
K, Kα: wall portion
S1, S2: side wall
Nk, Nk1, Nk2, Nk3, Nk4, Nk5, Nk6, Nk7, Nk8: recess portion
Rd, Rd1, Rd2, Rd3, Rd4, Rd5, Rd6, Rd7, Rd8: ridge portion
Tr: trough portion
Δh: predetermined length

The invention claimed is:

1. A lower-side spring-receiving member having a partially annular shape; and comprising:
a base end portion arranged at one end of the lower-side spring-receiving member, wherein an end portion of a suspension spring structured to include a rising portion extending up from a non-elastically-deformable end turn portion of the suspension spring is inserted in the base end portion;

a slope portion arranged at the other end of the lower-side spring-receiving member and having a thickness in a cross-sectional view, the thickness varying in accordance with a shape of the rising portion of the suspension spring; and a holding portion arranged between the base end portion and the slope portion, and holding the suspension spring, wherein the slope portion includes a recess portion formed on its bottom-surface;

when no spring load is applied from the suspension spring, the recess portion includes at least one ridge portion being formed in a substantially mountain shape, the at least one ridge portion is configured to extend downward from a top of the recess portion, to form a projection portion having, at both its sides, trough portions forming valley portions, in a cross-sectional view taken along a radial direction of the partially annular shape and is not in contact with a mounting surface on which the lower-side spring-receiving member is mounted; and when the spring load is applied on the lower-side spring-receiving member, the at least one ridge portion contacts the mounting surface and is deformed and compressed to apply a reaction force on the suspension spring.

2. The lower-side spring-receiving member according to claim 1, wherein the recess portion is includes a plurality of the ridge portions that are different from one another in heights or shapes in the cross-sectional view taken along the radial direction.

3. The lower-side spring-receiving member according to claim 1, wherein the ridge portion has a shape in which its width in the cross-sectional view taken along the radial direction increases in an upward direction so that a magnitude of the reaction force applied to the suspension spring gradually increases as the ridge portion is further compressed.

4. The lower-side spring-receiving member according to claim 1, wherein the recess portion has a substantially wedge shape, a substantially rhombic shape, or a substantially rectangular shape.

5. The lower-side spring-receiving member according to claim 1, wherein the recess portion is configured to have a wall portion having a shape extending in the radial direction.

6. The lower-side spring-receiving member according to claim 5, wherein the wall portion is provided inside the recess portion.

7. A suspension device comprising:

the lower-side spring-receiving member and the suspension spring, according to claim 1.

8. A lower-side spring-receiving member
having a partially annular shape; and
comprising:

a base end portion arranged at one end of the lower-side spring-receiving member, wherein an end portion of a suspension spring structured to include a rising portion extending up from a non-elastically-deformable end turn portion of the suspension spring is inserted in the base end portion;

a slope portion arranged at the other end of the lower-side spring-receiving member and having a thickness in a cross-sectional view, the thickness varying in accordance with a shape of the rising portion of the suspension spring; and a holding portion arranged between the base end portion and the slope portion, and holding the suspension spring, wherein the slope portion includes a recess portion formed on its bottom-surface along in a circumferential direction of the partially annular shape;

when no spring load is applied from the suspension spring, the recess portion includes ridge portions being formed in a substantially mountain shape in a cross-sectional view taken along a radial direction of the partially annular shape, each of the ridge portions extends downward from a top of the recess portion to form a projection portion having, at both its sides, trough portions forming valley portions, and at least one of the ridge portions is in contact with a mounting surface on which the lower-side spring-receiving member is mounted; and when the spring load is applied on the lower-side spring-receiving member, the ridge portions contact the mounting surface and are deformed and compressed to apply a reaction force on the suspension spring, wherein the recess portion includes a plurality of the ridge portions that are different from one another in heights or shapes in the cross-sectional view taken along the radial direction when no spring load is applied from the suspension spring.

9. The lower-side spring-receiving member according to claim 8, wherein the recess portion has a substantially wedge shape, a substantially rhombic shape, or a substantially rectangular shape.

10. A suspension device comprising:

the lower-side spring-receiving member and the suspension spring, according to claim 8.

11. A lower-side spring-receiving member
having a partially annular shape; and
comprising:

a base end portion arranged at one end of the lower-side spring-receiving member, wherein an end portion of a suspension spring structured to include a rising portion extending up from a non-elastically-deformable end turn portion of the suspension spring is inserted in the base end portion;

a slope portion arranged at the other end of the lower-side spring-receiving member and having a thickness in a cross-sectional view, the thickness varying in accordance with a shape of the rising portion of the suspension spring; and a holding portion arranged between the base end portion and the slope portion, and holding the suspension spring, wherein the slope portion includes a recess portion formed on its bottom-surface along in a circumferential direction of the partially annular shape;

when no spring load is applied from the suspension spring, the recess portion includes ridge portions being formed in a substantially mountain shape in a cross-sectional view taken along a radial direction of the partially annular shape and, each of the ridge portions extends downward from a top of the recess portion to form a projection portion having, at both its sides, trough portions forming valley portions, and at least one of the ridge portions is in contact with a mounting surface on which the lower-side spring-receiving member is mounted; and when the spring load is applied on the lower-side spring-receiving member, the ridge portions contact the mounting surface and are deformed and compressed to apply a reaction force on the suspension spring, and wherein each of the ridge portions has a shape in which its width in the cross-sectional view taken along the radial direction increases in an upward direction when no spring load is applied from the suspension spring so that a magnitude of the reaction force applied to the suspension spring gradually increases as the ridge portions are further compressed.

12. The lower-side spring-receiving member according to claim 11, wherein the recess portion is configured to have a substantially wedge shape, a substantially rhombic shape, or a substantially rectangular shape.

13. A suspension device comprising:

the lower-side spring-receiving member and the suspension spring, according to claim 11.

* * * * *

UNITED STATES PATENT AND TRADEMARK OFFICE
CERTIFICATE OF CORRECTION

PATENT NO. : 10,626,942 B2  
APPLICATION NO. : 15/551455  
DATED : April 21, 2020  
INVENTOR(S) : Shuji Ohmura et al.

Page 1 of 1

It is certified that error appears in the above-identified patent and that said Letters Patent is hereby corrected as shown below:

In the Claims

At Column 21, Line 35, "portion is includes" should be -- portion includes --.

At Column 23, Line 6, "shape and," should be -- shape, --.

Signed and Sealed this  
Eighth Day of September, 2020

Andrei Iancu  
*Director of the United States Patent and Trademark Office*